United States Patent [19]

Davis

[11] 4,008,583
[45] Feb. 22, 1977

[54] SWINGABLE SHIELD ASSEMBLY FOR TRACTOR POWER TAKE-OFF
[75] Inventor: Lewis Kie Davis, Waterloo, Iowa
[73] Assignee: Deere & Company, Moline, Ill.
[22] Filed: Aug. 21, 1975
[21] Appl. No.: 606,361
[52] U.S. Cl. .................................. 64/32 R; 64/3; 74/609; 180/82 R; 280/420
[51] Int. Cl.² ................................ F16D 3/84
[58] Field of Search ............. 64/32 R, 3; 180/82; 280/420; 74/609, 608, 15, 6

[56] References Cited
UNITED STATES PATENTS

| | | | |
|---|---|---|---|
| 2,858,680 | 11/1958 | Harrington | 64/3 |
| 2,967,432 | 1/1961 | Shane et al. | 74/609 |
| 3,504,508 | 4/1970 | Bornzin | 64/3 |
| 3,733,854 | 5/1973 | Young et al. | 64/32 |

FOREIGN PATENTS OR APPLICATIONS 221,375 10/1961 Austria .............. 64/32 R

Primary Examiner—Samuel Scott
Assistant Examiner—Randall Heald

[57] ABSTRACT

A swingable tractor PTO shield assembly has an inverted, U-shaped, shield member which is slidably and swingably attached to bracket means on the tractor and which extends above and to the sides of the PTO shaft. The shield member has a plurality of notches on its tractor proximate side edges which slidably engage pins in the bracket to allow the shield member to be swung into and held in a plurality of positions. The shield assembly further includes a cover member swingable on the tractor and slidable on the shield member for covering the space between the tractor and the shield member and which in the lowered position abuts a raised portion on the shield member to prevent movement thereof while both are horizontal.

8 Claims, 2 Drawing Figures

U.S. Patent  Feb. 22, 1977  4,008,583
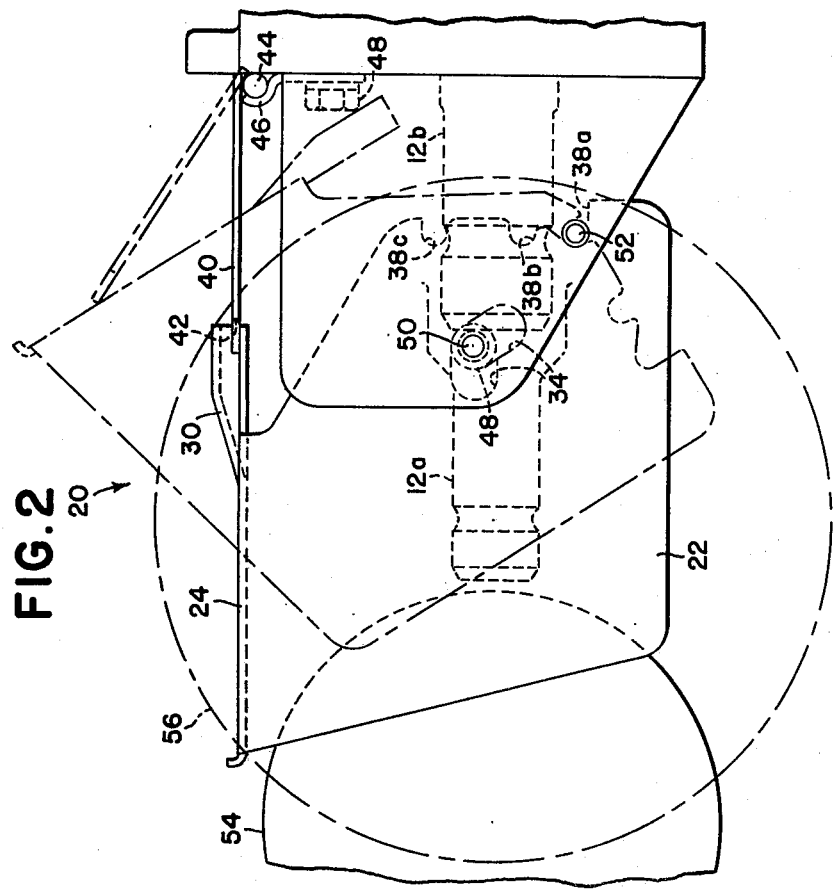
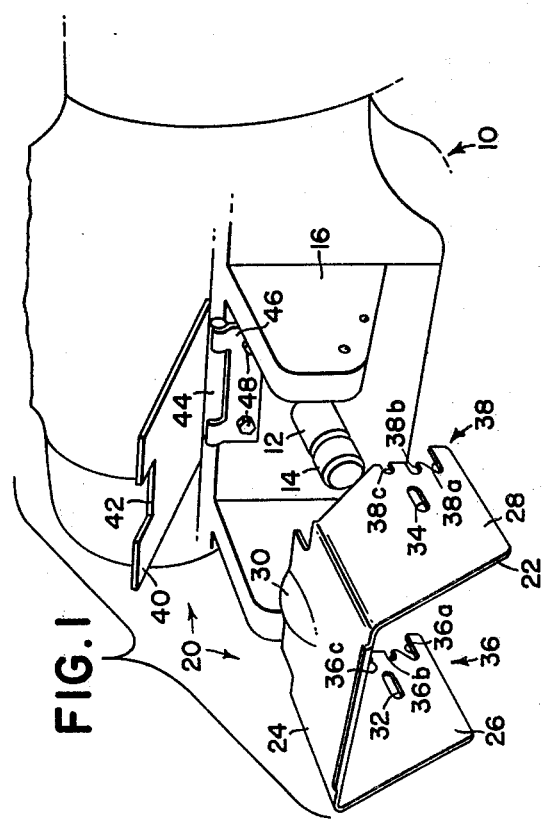

SWINGABLE SHIELD ASSEMBLY FOR TRACTOR POWER TAKE-OFF

BACKGROUND OF THE INVENTION

This invention relates generally to shields for tractor power take-off shafts, commonly referred to as PTO shafts, and more particularly to shields that are used over the tractor proximate articulated joint of the PTO shaft.

In agricultural and general purpose tractors provided with PTO shafts, the PTO shaft projects a short distance out from the tractor and is exposed to receive a universal joint and a PTO drive shaft for driving an implement which is mounted on or trailed from the tractor. It is customary to provide an inverted, U-shaped shield secured to the tractor and overlying the top and sides of the PTO shaft as shown in the U.S. Pat. No. 2,443,035 granted to L. A. Hardy on June 18, 1948, or to provide a detachable shield of similar configuration as shown in the U.S. Pat. No. 3,389,763 granted to H. W. Meinert granted on June 25, 1968.

Often when using either the permanently mounted or detachable shields, the operator will remove the shield to obtain greater accessibility to the PTO shaft for attaching or detaching the universal joint. The operator will then neglect to remount it due to the time and effort involved, thus resulting in a hazardous situation. Further, when the shield is removed from the tractor, it is easy to lose and thus the manufacturer's intent to have a safe vehicle will be circumvented.

In addition, when a universal joint shielding mechanism as shown in the U.S. Pat. No. 3,462,975 granted to A. B. Skromme et al on Aug. 26, 1969, is used the shield must be made as large as possible to accommodate the largest mechanism size.

SUMMARY OF THE INVENTION

The present invention provides a tractor PTO shaft shield assembly which is readily swingable to a plurality of positions to provide convenient access to the PTO shaft while accommodating a number of different universal joints and universal joint shielding mechanisms with a minimum size shield assembly. However, with the swinging safety shield, the shield only has to be swung to different positions in order to clear the U-joint shielding mechanism.

The above and additional advantages of the present invention will become apparent to those skilled in the art from a consideration of the following detailed description of the preferred embodiment when taken in conjunction with the accompanying drawings.

BRIEF DESCRIPTION OF THE DRAWINGS

FIG. 1 is a perspective view of one end of a tractor showing the power take-off area.

FIG. 2 is a side view showing the shield assembly of the present invention.

DESCRIPTION OF THE PREFERRED EMBODIMENT

Referring now to FIG. 1, therein is shown the rear of a tractor generally designated by the number 10. Protruding from the rear of the tractor 10 is a PTO shaft 12. The exposed end of the PTO shaft 12 is generally provided with spines 14 for receiving the yoke of a universal joint (not shown).

A mounting bracket means 16 which may be a standard part on the tractor such as a drawbar support is secured on the rear of the tractor 10. The bracket means 16 extends to the rear of the tractor on both sides of the PTO shaft 12 and cooperates with a shield assembly generally designated by the number 20 to protect an operator from the PTO shaft 12.

The shield assembly 20 includes a shield member 22 (shown in a removed position in FIG. 1) which is supported by the bracket means 16. The shield member 22 has a top 24 and sides 26 and 28. A raised stop portion 30 is formed in the top 24. Parallel slots 32 and 34 are provided in the respective sides 26 and 28. In the tractor proximate edges of the sides 26 and 28 are a plurality of paired orientation notches generally designated respectively by the numbers 36 and 38.

The shield assembly 20 also includes a cover member 40 which has a cut out 42 in the tractor distal edge. On the tractor proximate edge of the cover member 40 is welded a hinge pin 44 which is pivotally secured in a cover bracket 46 which is secured by bolts 48 to the tractor 10.

Referring now to FIG. 2, therein is shown the shield member 22 swingably secured to the bracket means 16 by a pair of spacers designated by the number 48 slidably positioned in the slots 32 and 34 and held by a pair of bolts and washers designated by the number 50.

A pair of holding pins 52 are mounted in the bracket means 16 between the bolts 50 and the rear of the tractor 10. The pins 52 engage the notches 36 and 38 which are made up of individual notches 36a, 36b, and 36c and 38a, 38b, and 38c, respectively, in the shield member 22. The individual notches are provided to allow the shield member 22 to be held in various positions to shield those universal joints with universal joint shielding mechanisms as disclosed in the Skromme et al patent, ranging in diameter from 7.5 inches up to 11 inches in diameter designated by the numbers 54 and 56, respectively, mounted respectively on PTO shafts 12a and 12b.

In operation, when the shield member 22 is in position over a minimum diameter universal joint shielding mechanism 54, the top 24 of the shield member 22 is horizontal. In this position the spacers 48 are in the tractor proximate portion of the slots 32 and 34 and the pair of pins 52 engage the notches 36a and 38a. The cover member 40 rests on the top 24 to cover the space between the tractor 10 and the shield member 22 which is required to provide clearance for movement of the shield member 22 between its various positions. The cut out 42 straddles the raised stop portion 30 so as to prevent the shield member 22 from being raised from the horizontal position without first raising the cover member 40 to clear the raised stop portion 30. To prevent the shield member 22 from being lowered below its horizontal position, the bottom portions of the notches 36a and 38a are sized so as to be greater than the length of the slots 32 and 34.

To move the shield member 22 to its second position, the cover member 40 is first lifted and then the shield member 22 is raised until the slots 32 and 34 slide longitudinally on the bolts and washers 50, and the notches 36b and 38b slide into engagement with the pins 52. The shield member 32 is moved to its third position in a similar manner until notches 36c and 38c are engaged. As the shield member 22 is raised, once the cover member 40 clears the raised stop portion 30 the tractor distal edge of the cover member 40 will slide along the top 24 while pivoting about the hinge pin 44 such that the operator will not have to handle the cover member 40 after initially lifting it above the raised stop portion 30.

Upon lowering the shield member 22 to its horizontal position, the cover member 40 will automatically drop into place to lock the shield member 22 in place.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A PTO shield assembly for a tractor having a PTO shaft protruding therefrom, comprising: an inverted, U-shaped, shield member extending above and to the sides of the PTO shaft and secured to the tractor for pivotation about a horizontal axis perpendicular to the axis of the PTO shaft; said shield member having orientation means provided therein for establishing a plurality of pivotable positions for the shield member; and holding means on the tractor engageable with the orientation means for holding the shield member pivoted in one of the plurality of pivotable positions.

2. The PTO shield assembly as claimed in claim 1 including a cover member pivotably secured to the tractor at one end for pivotation about an axis parallel to the horizontal axis and slidable on the top of the shield member at the other end, and wherein the top has a stop means for engaging the other end of the cover member when the top is horizontal and stopping movement of the shield member.

3. A PTO shield assembly for a tractor having a PTO shaft protruding therefrom, comprising: an inverted, U-shaped, shield member extending about the top and sides of the PTO shaft; the shield member having mounting means and orientation means provided therein; and bracket means secured at one end on the tractor proximate the PTO shaft and having means at the other end cooperating with the mounting means to define a horizontal axis perpendicular to the axis of the PTO shaft for slidably and swingably mounting the shield member to the bracket means for movement respectively perpendicular to and around the horizontal axis; the bracket means further including holding means cooperating with the orientation means for positioning and holding the shield member in a plurality of positions around the horizontal axis.

4. The PTO shield assembly as claimed in claim 3 wherein the top of the shield member is spaced from the tractor to provide clearance for movement of the shield member around the horizontal axis and the tractor proximate portion of the top includes a raised stop area; and including a cover member covering the space between the tractor and the shield member and pivotably secured to the tractor at one end for pivotation around an axis parallel to the horizontal axis and slidable on the top at the other end to a lowered position abutting the raised stop area when the shield member is moved towards a raised position from a horizontal position.

5. A PTO shield assembly for a tractor having a PTO shaft protruding therefrom, comprising: an inverted, U-shaped, shield member extending above and to the sides of the PTO shaft; the shield member having a slot and a plurality of orientation notches provided in one side respectively parallel to a slot and a plurality of orientation notches provided in the other side; and bracket means secured at one end to the tractor proximate the PTO shaft and having pivot means at the other end positioned through the slots and forming a horizontal axis perpendicular to the axis of the PTO shaft for slidably and swingably securing the shield member to the bracket means for movement radially to and around the horizontal axis; the bracket means including holding pin means positioned between the ends of the bracket means having axes parallel to the horizontal axis engageable with the notches in the shield member to hold the shield member in one of a plurality of positions established by the plurality of notches when the shield member is slidably and swingably moved from one of the plurality of positions to another.

6. The PTO shield assembly as claimed in claim 5 wherein a notch includes means cooperating with the slot to prevent lowering of the tractor distal edge of the top of the shield member below the plane formed when the top is horizontal.

7. The PTO shield assembly as claimed in claim 5 wherein the top of the shield member is spaced from the tractor to provide clearance for movement of the shield member around the horizontal axis and the tractor proximate portion of the top includes a raised stop area; and including a cover member covering the space between the tractor and the top and pivotably secured to the tractor at one end for swinging about an axis parallel to the horizontal axis and slidable on the top at the other end, the cover member having a cut-out at the other end abutting the raised stop area when the tractor distal edge of the top of the shield member is moved above the plane formed when the top is horizontal.

8. A PTO shield assembly for a tractor having a PTO shaft protruding therefrom, comprising: an inverted, U-shaped, shield member spaced from the tractor and extending above and to the sides of the PTO shaft; the shield member having a slot provided in one side parallel to a slot provided in the other side and parallel to the top of the shield member; the shield member further having a plurality of notches provided in the tractor proximate edge of the one side parallel to a plurality of notches provided in the other side; bracket means secured to one end of the tractor extending to both sides of the PTO shaft and having pivot means at the other end positioned through the slots and forming a horizontal axis perpendicular to the axis of the PTO shaft for slidably and swingingly securing the shield member to the bracket means for movement radially to and around the pivot means; the bracket means including pin means positioned between the ends thereof having axes parallel to the horizontal axis engageable with the notches in the shield member when the shield member is slidably and swingably moved from one of the plurality of positions to another; one of said notches being of greater length than the length of the slot to prevent lowering of the tractor distal edge of the top of the shield member below the plane formed when the top is horizontal; the shield member including a raised stop area; a cover member covering the space between the tractor and the top pivotally secured to the tractor at one end for swinging about an axis parallel to the horizontal axis and slidably on the top at the other end, the cover member having a cut out at the other end removably abutting the raised stop area when the tractor distal edge of the top of the shield member is moved above the plane formed by the top when the top is horizontal.

* * * * *